RETENTION MEANS FOR TELEPHONE HANDSETS

Filed Aug. 21, 1964

INVENTOR.
ALLEN A. FOSTER, JR.
BY Angus & Mon
ATTORNEYS.

United States Patent Office 3,377,442

Patented Apr. 9, 1968

3,377,442

RETENTION MEANS FOR TELEPHONE HANDSETS

Allen A. Foster, Jr., 477 W. Loma Alta, Altadena, Calif. 91001

Filed Aug. 21, 1964, Ser. No. 391,223
10 Claims. (Cl. 179—186)

This invention relates to telephone installations, and more particularly to means for minimizing the theft of handsets.

It is well-known in the telephone trade that the theft of handsets from pay stations is a growing and bothersome problem. There appears to be a substantial use for stolen handsets, and some persons find it profitable to steal them. In order to dissuade thieves and vandals, the familiar plastic-covered cord, which is relatively easy to cut, has had to be replaced by an armored cord. The armored cord is essentially a spiral round conduit of hard material such as stainless steel. The softer plastic-coated wire runs inside the armored cord. Because of its spiral configuration, the armored cord is flexible enough to bend as required. It shrouds and protects the softer cord inside. Thus, if a persons wishes to cut the armored cord, he must come prepared with special tools for the purpose. This dissuades many potential thieves.

The armored cord solves only the problem of easy cutting. It leaves unsolved the possible theft or vandalism comprising yanking the handset free of the telephone baseboard so as to pull the cord loose at one of its ends, and thereby free the handset. Attempts have been made to provide an anchor strong enough that a pull would either destroy the handset or pull the backboard off the wall before freeing the handset. Such a potential would obviously dissuade casual thieves. The problems inherent in the firm anchoring of the ends of the armored cable have not as yet been adequtely solved, for the reason that the space within the telephone baseboard structure is very limited. Neither of these elements was designed for protection against theft of the handset, and it is not surprising that conventional means have not yet been made to fit the environment.

It is therefore an object of this invention to provide means for anchoring the two ends of an armored cable, one to the telephone baseboard, and one to the handset itself, which means will strongly anchor the armored cord, and this inside regions which were not originally intended to accommodate means for such a function.

This invention is carried out in a combination including the baseboard which has a retaining wall with a port therethrough, an armored cord, and a telephone handset whch has a microphone cavity with a passage through the handset into the cavity. The armored cord goes through the passage into the cavity, and through the port past the retaining wall. First retention means is provided for restraining the armored cord against removal from the port, comprising a first plate that has a lateral dimension greater than that of the port so as to be unable to pass therethrough. First engagement means is attached to the first plate and adapted to be moved into restraining contact with the armored cord. Second retention means comprises a second plate disposed in the microphone cavity, which plate has a lateral dimension greater than that of the passage so as to be unable to pass therethrough. Second engagement means is attached to the second plate which last-named means is adapted to engage and hold the armored cord to the handset.

The above and other features of this invention will be fully understood from the following detailed description and the accompanying drawings in which.

Figures 1, 2, 3, 4, 5, 6, 7:
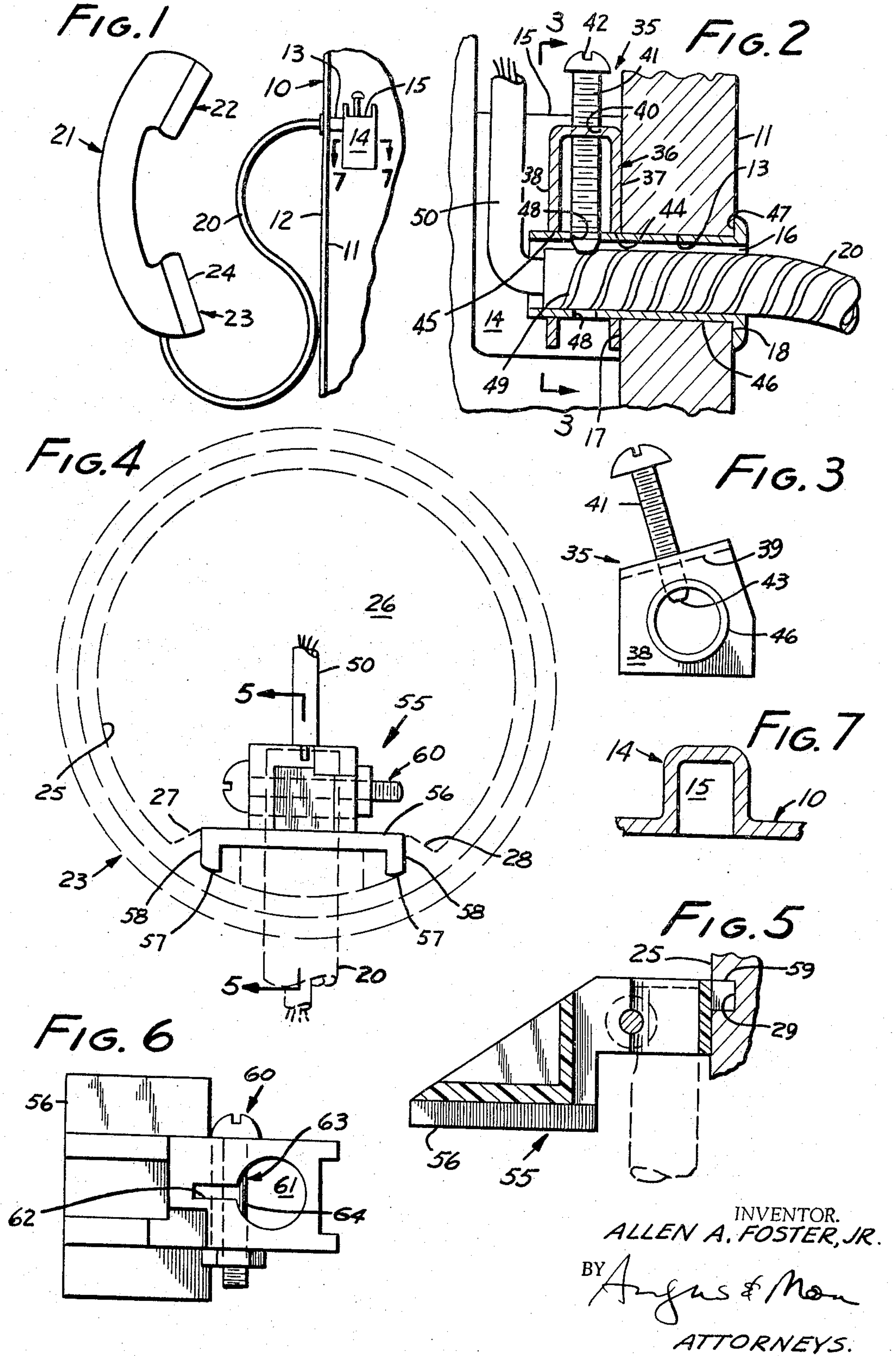
FIG. 1 is a fragmentary elevation showing the environment of the invention.
FIG. 2 is a side elevation partly in cut away cross-section showing first retention means according to this invention.
FIG. 3 is a fragmentary side view taken at line 3—3 of FIG. 2 showing a portion thereof.
FIG. 4 is a plan view of a portion of FIG. 1 illustrating the second retention means.
FIG. 5 is a cross-section taken at line 5—5 of FIG. 4.
FIG. 6 is a top view of FIG. 5.
FIG. 7 is a fragmentary cross-section taken in line 7—7 of FIG. 1.

FIG. 1 illustrates the general environment of the invention which includes a baseboard 10 that is adapted to be mounted to the wall of a telephone toll station. A retaining wall 11 includes a flange 12, a sleeve 13, and a hoop 14 all of which are integral with the baseboard. The hoop leaves a side opening 15 to be described later. A port 16 passes through the flange, sleeve, and hoop, entering into opening 15. The retaining wall therefore has two opposite sides 17, 18 connected by sleeve 13.

An armored cord 20 is attached to the baseboard. At the other end of the armored cord there is a standard handset 21 which includes a speaker end 22 and a microphone end 23.

FIG. 4 illustrates the microphone end with its screw cap 24 (FIG. 1) and microphone (not shown) removed. Wall 25 bounds a cavity 26 within which the microphone and other circuit elements (not shown) are ordinarily held. It is one of the objects of this invention to connect armored cord 20 to the handset by utilizing means within the limited region of the cavity, which already has many circuit elements and little void space therein.

The wall 25 of the cavity bears a pair of side rails 27, 28. These are parallel to each other and project into the cavity. There is also a declivity 29 (FIG. 5) within wall 25.

The means for attaching the armored cord to the baseboard will first be described. First retention means 35 includes a first plate 36. This plate is preferably formed in a U-shape including two legs 37, 38 connected by a bight 39. A perforation 40 passes through the bight to receive first engaging means in the form of a self tapping screw 41 which is headed and carries a slot 42 for engagement by a screwdriver. As can best be seen in FIGS. 2 and 3, turning the screw into the perforation will causes its pointed end 43 to move into the region between the legs. Each of the legs includes a circular perforation 44, 45. The plate has a greater lateral dimension on leg 37 than a respective lateral dimension of port 16 so it will be restrained by the retaining wall against passage through the port.

A ferrule 46 includes a shoulder 47 adapted to bear against the side of the retaining wall opposite from that of the first plate. This ferrule includes a pair of openings 48, there being two for ease in aligning one of the holes with screw 41. The ferrule passes through sleeve 13, perforations 44 and 45. End 43 of the screw passes through one of openings 48 to engage the armored cord, preferably in the groove 49 between convolutions of the strip which forms the armored cord.

The first plate fits inside hoop 14 and, access to it can be had from the upper end as best shown in FIG. 1. The head of the screw can readily be reached. The assembly technique is quite simple. The plate is first put in place inside the hoop with the screw withdrawn, then the ferrule is pushed through the port until the shoulder bears against the retaining wall. Then the screw is threaded through one of openings 48 and the armored cord is then thrust through the ferrule and the screw moved down tightly onto the armored cord so as to firmly engage it and hold it in place, both against rotational motion and against withdrawal.

It will be seen that both the ferrule and the armored cord take up some of the endwise stresses which can be developed by a pull on the armored cord. It will further be noted that the armored cord cannot be pushed to the left in FIG. 2 because this is restrained by the shoulder on the ferrule. A person cannot force enough slack into the hoop to enable him to get a good start and thus exert a sharp jerk on the armored cord. This is an additional protection against separation. Conductors 50 are led out of the hoop for connection in conventional arrangements.

Second retention means 55 is provided in the handset to retain the other end of the armored cord. Because the cavity of the microphone end of the set is already quite full of compact equipment such as a microphone, connectors, and the like, the first retention means cannot be utilized successfully in this location. Therefore, the retention means shown in FIGS. 4–6 is provided. This second retention means includes a second plate 56 with abutment surfaces 57 intended to abut the lower surface of the cavity as illustrated in FIG. 4. A pair of side shoulders 58 abut the side rails 27 and 28 thereby limiting the sideward movement of the plate. Abutment surface 59 comprising a tip on the plate is adapted to enter into declivity 29. It will now be seen that when the armored cord is mounted to second plate 56, abutment surfaces 57 prevent this plate from moving downward, and surface 59 prevents it from moving up, both in FIG. 4, so that slack cannot be stuffed into the cavity to enable a person to get a start in yanking the cord free. The second plate is therefore firmly anchored within this region.

It will further be noted that the armored cord enters the plate at a location immediately adjacent to abutment surface 59. Therefore, even though the left-hand end of the plate as illustrated in FIG. 5 (the top surface in FIG. 4) is not supported against motion in a vertical direction in FIG. 4, still not enough moment of force can be developed on the second plate by a vandal to cause any significant rotational or axial motion of it.

Engagement means 60 is provided on the second plate. This engagement means includes a hole 61 passing through the plate and a split region 62 opening into the hole. Clamp means 63, such as a nut and a bolt, pass through and clamp across the split region. The shank 64 of the clamping means enters the hole to a depth sufficient to engage in the groove of the armored cord. Also, tightening of this means will squeeze the wall of the hole against the armored cord, thus to provide both retention against axial withdrawal of the cord, and also retention against its rotation.

The conductors 50 inside the armored cable enter the cavity beyond the plate where they are attached to the electrical portions of the system in accordance with conventional techniques.

It is believed that the installation of the device should be evident from the foregoing. It provides means whereby a telephone handset can be attached to a baseboard with a firm anchorage at both ends, which anchorage provides both protection against cutting by virtue of use of an armored cord and protection against twisting and yanking the handset loose at either end. The construction is both inexpensive to manufacture, simple and expedient to install, and compatible with most well-known telephone constructions.

This invention is not to be limited by embodiments shown in the drawings and described in the description which are given by way of example and not of limitation but only in accordance with the scope of the appended claims.

I claim:

1. In combination: a baseboard having a retaining wall with a port therethrough; an armored cord; a telephone handset having a microphone cavity with a declivity, and a passage through the handset into the cavity, the armored cord passing through the passage into the cavity and through the port past the retaining wall; first retention means for restraining the armored cord against removal from the port comprising a first plate having a lateral dimension greater than that of the port so as to be unable to pass therethrough, and first engagment means attached to the first plate and adapted to be forced into restraining contact with the armored cord; and and second retention means comprising a second plate in said microphone cavity and having a lateral dimension greater than that of the passage so as to be unable to pass therethrough, a post on said second plate adapted to enter said declivity, thereby to be restrained against motion in one direction, an abutment surface on said second plate adapted to engage the handset inside the cavity, thereby to be restrained against motion in a direction opposite to the first-named direction, and second engagement means attached to the second plate which last-named means is adapted to engage and hold the armored cord, the second engagement means thereby restraining the armored cord against motion in either of said directions.

2. A combination according to claim 1 in which the retaining wall has two sides, and in which a ferrule having a shoulder with a greater lateral dimension than the port, is disposed at the opposite side of the retaining wall from the first plate, the first engagement means passing through the ferrule to engage and restrain both the ferrule and the armored cord, thereby, with the said shoulder, restricting axial movement of the armored cord in the port in both directions.

3. A combination according to claim 2 in which the first plate is U-shaped, including a pair of legs and an adjoining bight, the legs having aligned perforations therethrough, a screw being threaded through the bight so as to engage the armored cord when it is passed through the perforations.

4. A combination according to claim 1 in which the second plate includes a hole aligned with the passage to receive and pass the armored cord, and in which the second retention means comprises an elongated member which enters the said hole, there to engage the armored cord.

5. A combination according to claim 4 in which the second plate includes a split portion opening into the hole, and in which the second retention means comprises clamping means for pulling the second plate together at the split portion, thus to exert a compressive force on the armored cord.

6. A combination according to claim 5 in which the second plate and the telephone handset include interengaging lateral restraint means for restricting lateral movement of the armored cord relative to the passage.

7. In combination: an armored cord; a telephone handset having a microphone cavity having a declivity, and a passage through the handset into the cavity, the armored cord passing through the passage into the cavity; and second retention means comprising a second plate in said microphone cavity and having a lateral dimension greater than that of the passage so as to be unable to pass therethrough, a post on said second plate adapted to enter said declivity, thereby to be restrained against motion in one direction, an abutment surface on said second plate adapted to engage the handset inside the cavity, thereby to be restrained against motion in a direction opposite to the first-named direction, and second engagement means attached to the second plate, which last-named means is adapted to engage and hold the armored cord, the second engagement means thereby restraining the armored cord against motion in either of said directions.

8. A combination according to claim 7 in which the second plate includes a hole aligned with the passage to receive and pass the armored cord, and in which the second retention means comprises an elongated member which enters the said hole, there to engage the armored cord.

9. A combination according to claim 8 in which the plate includes a split portion opening into the hole, and in which the second retention means comprises clamping means for pulling the plate together at the split portion, thus to exert a compressive force on the armored cord.

10. A combination according to claim 9 in which the second plate and the telephone handset include interengaging lateral restraint mans for restricting lateral movement of the armored cord relative to the passage.

References Cited

UNITED STATES PATENTS

| | | | |
|---|---|---|---|
| 1,795,577 | 3/1931 | Schneider et al. | 174—65 |
| 2,074,898 | 3/1937 | Fotsch | 339—272 |
| 2,120,993 | 6/1938 | Selig | 174—65 |
| 2,577,751 | 12/1951 | Halstead | 325—57 |
| 2,659,765 | 11/1953 | Dunn | 174—65 |

KATHLEEN H. CLAFFY, *Primary Examiner.*

A. H. GESS, *Assistant Examiner.*